(12) United States Patent
Berndt (10) Patent No.: US 6,747,448 B2
(45) Date of Patent: Jun. 8, 2004

(54) ROTARY POSITION SENSOR METHODS AND SYSTEMS

(75) Inventor: Dale F. Berndt, Plymouth, MN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/219,202

(22) Filed: Aug. 14, 2002

(65) Prior Publication Data

US 2004/0032255 A1 Feb. 19, 2004

(51) Int. Cl.[7] .................................................. G01B 7/30
(52) U.S. Cl. ............................ 324/207.15; 324/207.16; 324/207.17; 324/207.22; 324/207.25
(58) Field of Search ...................... 324/207.16, 207.17, 324/207.22, 207.25, 164, 166, 173; 318/660, 661; 310/68 B; 336/75, 77, 79, 120, 135; 123/406.58

(56) References Cited

U.S. PATENT DOCUMENTS

| | | | |
|---|---|---|---|
| 4,274,053 A | | 6/1981 | Ito et al. |
| 4,589,038 A | | 5/1986 | Radtke |
| 4,599,561 A | | 7/1986 | Takahashi et al. |
| 4,616,281 A | | 10/1986 | Nakamura |
| 4,638,250 A | * | 1/1987 | Shen-Orr et al. ....... 324/207.17 |
| 4,677,377 A | | 6/1987 | Takahashi et al. |
| 4,694,688 A | | 9/1987 | Takahashi et al. |
| 4,707,695 A | | 11/1987 | Takahashi et al. |
| 4,713,613 A | | 12/1987 | Takahashi et al. |
| 4,774,464 A | | 9/1988 | Kubota et al. |
| 4,985,691 A | * | 1/1991 | Pulyer et al. ................ 336/130 |
| 4,998,103 A | * | 3/1991 | Rosswurm et al. .... 340/870.37 |
| 6,084,416 A | * | 7/2000 | Kishimoto ......... 324/207.25 X |
| 6,259,249 B1 | * | 7/2001 | Miyata .................. 324/207.17 |
| 6,304,014 B1 | * | 10/2001 | England et al. ........... 310/68 B |
| 6,304,076 B1 | * | 10/2001 | Madni et al. .......... 324/207.17 |
| 6,534,970 B1 | * | 3/2003 | Ely et al. ............... 324/207.17 |

OTHER PUBLICATIONS

Asad Madni et al.; "The Next Generation of Position Sensing Technology, Part 2: Differential Displacement and Linear Capabilities"; magazine article in Sensors; Mar. and Apr. 2001, vol. 18, No. 3 and 4 (copy as presented online at http://www.sensorsmag.com/articles/0401/main.shtml, 9 pgs.).

* cited by examiner

Primary Examiner—Jay Patidar
Assistant Examiner—Darrell Kinder
(74) Attorney, Agent, or Firm—Kris T. Fredrick; Kermit D. Lopez; Louis M. Ortiz

(57) ABSTRACT

An apparatus and method are disclosed herein for sensing rotary position. A rotor and stator are positioned proximate to one another but are not in contact with one another. The rotor comprises at least one radial spoke for receiving angular information from the stator, wherein the rotor is located in a non-contact position proximate to the stator. Preferably, the rotor comprises only one radial spoke for receiving the angular information from the stator. Additionally, a coil or other transmitting member is located centrally between the stator and the rotor, wherein the angular information is broadcast to the stator from the rotor through the coil to resolve angles between spoke positions thereof and thereby accurately sense rotary position.

17 Claims, 5 Drawing Sheets

ROTARY POSITION SENSOR METHODS AND SYSTEMS

TECHNICAL FIELD

The present invention generally relates to sensing devices and sensing techniques thereof. The present invention also relates to magnetic sensors. Additionally, the present invention relates to rotary position sensors. The present invention is also related to cam and crank applications, such as camshaft and crankshaft devices.

BACKGROUND OF THE INVENTION

A variety of techniques are utilized for angular position sensing. Optical, resistive, electrical, and electrostatic and magnetic fields have all been utilized with sensing devices to measure position. There are many known devices that utilize optical, resistive, electrical, magnetic and other such energies for sensing. Examples of such sensing devices include resistive contacting sensors, inductively coupled ratio detectors, variable reluctance devices, capacitively coupled ratio detectors, optical detectors utilizing the Faraday effect, photo-activated ratio detectors, radio wave directional comparators, and electrostatic ratio detectors. In addition, there are many other sensors/detectors that are not mentioned herein.

Each of these detection methods offers much value for one or more applications, but none meet all application requirements for all position sensing applications. The limitations may be due to cost, sensitivity to particular energies and fields, resistance to contamination and environment, stability, ruggedness, linearity, precision, or other similar factors. Transportation applications generally, and specifically automotive applications, are very demanding.

In mechanical and/or electromechanical systems, such as for example, automotive applications, motion can be initiated and controlled by rotating a member such as a shaft (e.g., camshaft, crankshaft, and so forth). The angular motion of the shaft is then translated into some other motion, such as linear displacement, rotation of a pump or fan, or the angular rotation of some other intermediate part at a different angular velocity or spatial orientation. Numerous mechanical means such as gears, cams, pulleys, and belts are commonly employed in translating the angular motion of an input shaft to drive an output device. Camshaft and crankshaft mechanisms, for example, are well known in the mechanical transportation arts. Thus, a need exists for sensors that can properly monitor motion and position in such mechanical systems.

In engine cam and crank applications, for example, recently manufactured cars require precision rotary sensors for high performance and fuel economy. In particular, some of the new camless engines require precision rotary sensors. Such engines utilize electrical-mechanical solenoids to control the engine valves. The opening and closing of such valves are not controlled by a fixed cam but can be controlled by a microprocessor that receive inputs from precision rotary sensors regarding the crank, speed, torque, load, exhaust gas mixture, oxygen content, and so forth. In this manner, an engine can be achieved that is both efficient and high performing.

Thus, a critical need exists for high performance camshaft and crankshaft position sensors. Major automakers worldwide are presently working, for example, on camless four-stroke engines because of potential performance advantages and reduction in mechanical components subject to wear. A number of development hurdles must be overcome before such mechanical systems can be widely deployed. Cost will limit the camless engine to high-performance cars for some time. Obviously, camless engines do not require a camshaft sensor. On the other hand, valve position sensors will very likely be needed. Developers are presently faced with the challenge of creating cost-effective solutions now, in anticipation of this emerging need. As transport systems develop in their complexity and performance, a need has emerged for non-contact rotary position sensors, which offer significant durability enhancements, lower cost, and improved performance.

Rotary position sensors play a particularly critical role in crankshaft applications used in automotive and other transport systems (e.g., trucking, aerospace, etc.), because the U.S. government requires misfire detection as part of the On-Board Diagnostics incorporated in the engine control system to detect failures of any components of the system. Such failures could result in emissions not being controlled within the proper limits. The misfire event must be identified down to a specific cylinder except at low loads and high rpm. A "misfire" is generally known as an absence of combustion in one or more cylinders, either occurring singly or multiple times. It can be caused by a failure of the ignition system to provide spark or by a failure in the fuel injection system resulting in fuel not being provided to a cylinder. It differs from "knock", which is spontaneous ignition of the fuel-air mixture. Knock can result in engine damage and is a function of several parameters of both the engine and the fuel used. Engines expected to operate on a variety of fuels usually incorporate a knock detection and prevention function in the engine control system. Misfires typically do not result in engine damage but may cause failure of the catalytic converter if it has to cope with unburned gases.

Each time ignition occurs, the resulting power stroke accelerates the crankshaft and it then decelerates at a rate determined by the load on the engine. The basic equation governing crankshaft angular acceleration/deceleration is as follows: $\alpha = d\omega/dt = d^2\theta/dt^2 = (T_P - T_L)/I$, where $T_P$=Torque produced by engine, $T_L$=Load torque, and I=Moment of inertia of drive train.

A four-stroke engine, for example, produces N/2 torque pulses per crankshaft revolution, where N=number of cylinders. For a constant load torque, the crankshaft accelerates each time a combustion event occurs, followed by a deceleration due to the load torque. By measuring these speed fluctuations, misfires can be detected since a larger deceleration will occur if one or more firing pulses are missed. For a fixed engine displacement, each power pulse becomes smaller as the number of cylinders increases, reducing the magnitude of the speed fluctuations. Likewise, as the load on the engine decreases, the engine decelerates less between power pulses. A variation in load torque due to a bump in the road may also result in a crankshaft speed fluctuation and possibly be confused with a misfire. The misfire detection algorithm is disabled when load torque fluctuations occur, either by an accelerometer signal or by monitoring wheel speed fluctuations. The crankshaft speed fluctuation method is the most widely used approach since most engines already incorporate a crankshaft position sensor.

To be usable for misfire detection by the crankshaft speed fluctuation method, a sensor must have excellent repeatability. Repeatability is affected primarily by the sensor's sensitivity to dynamic radial and axial run-out of the target and by the signal-to-noise ratio of the sensor. Generally, a target can be made wide enough so that axial run-out does not result in any error. The error due to dynamic radial run-out is proportional to the error as a function of air gap so that a sensor with minimum error as a function of air gap is preferred. Typical gear tooth sensors have three main error sources: air gap error, speed error, and temperature error. In general, auto manufacturers desire precision rotary sensors for gearshift levers (e.g., P, R, N, 1, 2, 3, DR). In addition, new automobiles require an absolute rotary position at startup and cannot wait for one or more revolutions of the crank to find the top dead center (TDC) as with gear tooth rotary sensors.

Thus, it can be appreciated that it is very desirable to monitor the position of various mechanical parts within a mechanical system. In many cases, however, due to space restrictions or other physical characteristics, it is inconvenient or impossible to directly monitor the position of a particular part. In such cases it is often easier to monitor the position of the part indirectly. For example, in the mechanisms described above, measuring the angular position of the front wheels directly would be a difficult and expensive proposition. Thus, by utilizing a rotary position sensor in association with an automobile, it is possible to generate an electrical signal, which indicates the angular position of the front wheels.

The relationship between the angular position of a rotating input shaft and the position of an output or intermediate mechanical member is ubiquitous throughout the mechanical arts. In some applications, such as servomotors, a position sensor is mounted directly to the output shaft of a motor, and the output position and/or speed of the machine can be readily determined by monitoring the rotation of the motor. In any mechanical system wherein the output position of a mechanical part is to be determined by the position of a rotating input shaft, a key element is the rotary position sensor.

A rotary position sensor must accurately and reliably determine the angular position of the input shaft before that information can be extrapolated into the position of the output member. In addition to accuracy and reliability issues, each specific application will provide its own demands and limitations on the design of the rotary position sensor.

In some systems it may only be necessary to sense rotation over a single turn. In still other applications, physical constraints may make it difficult to couple electrical signals to the rotating portion of the sensor. And finally, the cost of various position sensors may be an overriding factor in determining the best sensor for a particular application.

Some rotary position sensors currently in use include rotary potentiometers, inductive position resolvers, and optical encoders. Each device has characteristic advantages and disadvantages, which make some devices more suitable for particular applications than for others. Rotary potentiometers, for example, supply a voltage signal proportional to the position of a wiper contact, which rides along a resistive element. Initially, such rotary potentiometers are quite accurate and provide excellent position indication over a single turn of the input shaft. Over time, however, the sliding motion of the wiper contact over the resistive element can lead to wear which alters the resistance ratio between the resistive element and the wiper contact, leading to inaccuracy in the output position signal.

Rotary potentiometers are also subject to contamination of the contact elements, which can adversely affect the accuracy of the device. For these reasons, rotary potentiometers are not well suited for those applications where extended long-term reliability is required or where harsh environmental conditions are likely to adversely affect the sensor. Thus, a rotary potentiometer would be particularly unsuited for application in the crankshaft and camshaft mechanisms described above.

Inductive position resolvers, on the other hand, have advantages over rotary potentiometers in that they are non-contact devices. Resolvers operate on inductive principles, having mutually coupled coils mounted to both a rotor and a stator. As the rotor coil rotates relative to the stator coil, the mutual inductance between the two coils changes such that a voltage signal impressed on the stator coil will be coupled to the rotor coil in varying strength depending on the angular relationship between the coils. While resolvers have obvious advantages over rotary potentiometers, a drawback is that they require signal connections to the rotating member. Therefore, slip rings or some other mechanism for connecting electrical signals to the rotating member are required. Also, resolvers are generally more expensive than rotary potentiometers and more sensitive to vibration and shock.

Finally, optical encoders are often used as rotary position sensors, but such devices also offer significant drawbacks for certain applications. As with resolvers, optical encoders tend to be expensive, thus making them inappropriate for those applications where low cost is a critical design factor. Furthermore, encoders are digital devices, emitting light pulses for each fraction of a rotation of the input shaft. The resolution of an encoder is determined by physical limitations in the number of pulses, which can be generated per revolution of the input shaft. Thus, optical encoders are inappropriate for applications where a continuous analog signal is required. In particular, such devices are not well suited for camshaft and crankshaft mechanisms.

It can thus be appreciated based on the foregoing that in many automotive and transportation applications, a low-cost, durable analog sensor is required. In most such cases a non-contact type sensor is preferred where the rotating member within the sensor has no physical contact with the stator in order to prevent wear between the rotating parts. In some cases it may be necessary to provide a non-contact rotary sensor where there are no electrical connections required for coupling signal to the rotating member. In still other cases it may be necessary to provide a rotary position sensor where the sensor provides a continuous analog signal over a multi-turn range of the input shaft.

The automotive and other transportation industries (e.g., aerospace, trucking, heavy equipment, etc.) thus require absolute precision rotary sensors for increased demands for a cleaner environment, increased fuel economy, and better performance. Rotary sensors generally must be configured as non-contact rotary sensors for accuracy of less than one degree and should operate continuously through 360 degrees.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensing device and sensing technique thereof.

It is still another aspect of the present invention to provide an improved magnetic-based sensor.

It is yet another aspect of the present invention to provide an improved rotary position sensor.

It is also an aspect of the present invention to provide an improved rotary position sensor that can be utilized in association with engine cam and crank applications.

The above and other aspects can be achieved as is now described. An apparatus and method are disclosed herein for sensing rotary position in automotive, transportation and other mechanical and electro-mechanical applications. Generally, a rotor and stator are positioned proximate to one another but are not in contact with one another. The rotor comprises at least one radial spoke for receiving angular information from the stator, wherein the rotor is located in a non-contact position proximate to the stator. Preferably, the rotor comprises only one radial spoke for receiving the angular information from the stator. Additionally, a coil or other transmitting member can be located centrally between the stator and the rotor, wherein the angular information is broadcast to the stator from the rotor through the coil to resolve angles between spoke positions thereof and thereby accurately sense a rotary position.

The rotor comprises a passive rotor and includes a transmitting coil associated with the rotor. A receiving coil is associated with the stator. Additionally, at least one transmitting spoke is associated with the stator. Such a transmitting spoke transmits a delayed signal in electrical degrees comprising data indicative of a physical location of one or more transmitting spokes on the stator. The stator also can be associated with a digital phase generator ASIC (application specific integrated circuit). The stator is thus generally configured to include a stator transmitter and a stator receiver.

The present invention generally comprises two discs (i.e., a stator and a rotor) that can be fabricated utilizing standard PC board technologies. The rotor (i.e., rotor disc) is not in contact with the stator (i.e., stator disc). The rotor is completely passive (i.e., no active components) and comprises a single radial spoke for receiving angular information from the stator and re-broadcasting this information back to the stator by means of coils located near the center of the rotor and the stator. The stator has N transmitting spokes, wherein each spoke can transmit a delayed signal in electrical degrees that corresponds exactly to the physical location of the spoke on the stator disc.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
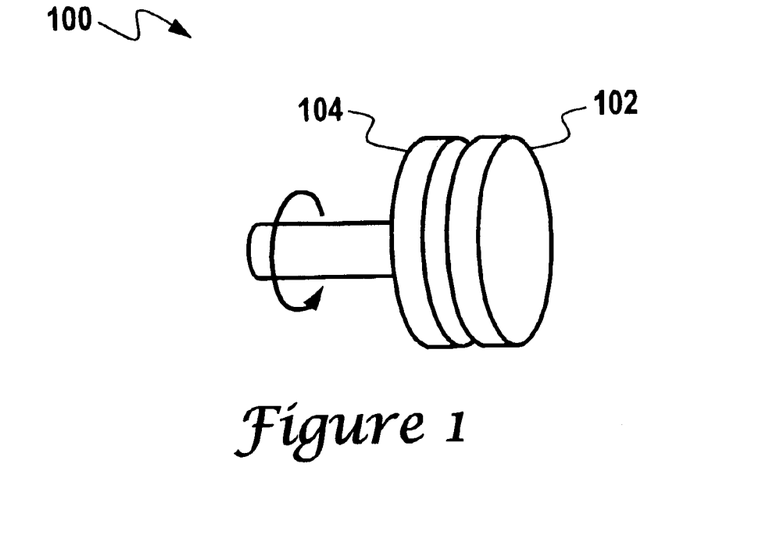
FIG. 1 depicts a diagram illustrative of a gearless rotary sensor in accordance with a preferred embodiment of the present invention.

FIG. 1 depicts a diagram illustrative of a gearless rotary sensor 100 in accordance with a preferred embodiment of the present invention. Gearless rotary sensor 100 generally includes a rotor 104 and a stator 102. Note that as utilized herein the terms "rotor" and "rotor disc" may be utilized interchangeably. Also, the terms "stator" and "stator disc" may be utilized interchangeably. Rotor 104 generally comprises a passive rotor capable of operating at high temperatures. Stator 102 generally comprises a radial design and can be configured to include a digital ASIC. No physical contact is present between rotor 104 and stator 102.

Gearless rotary sensor 100 illustrates a configuration that requires only two discs. One disc (i.e., stator 102) is stationary while the other disc (i.e., rotor 104) is free to rotate with no sliding contacts. The configuration depicted in FIG. 1 does not require the use of ideal sine wave generators and can be configured to utilize digital logic. Stator 102 generally can include a plurality of radial spokes. Each radial spoke can transmit a phase-delayed pulse. The phase delay is generally transmitted as data indicative of electronic degrees corresponding to the actual physical degrees of the transmitting spoke. The system indicated in FIG. 1 can be easily implemented, among other techniques, with a digital ASIC at low cost with an anticipated accuracy greater than 0.5 degrees.

Figure 2:
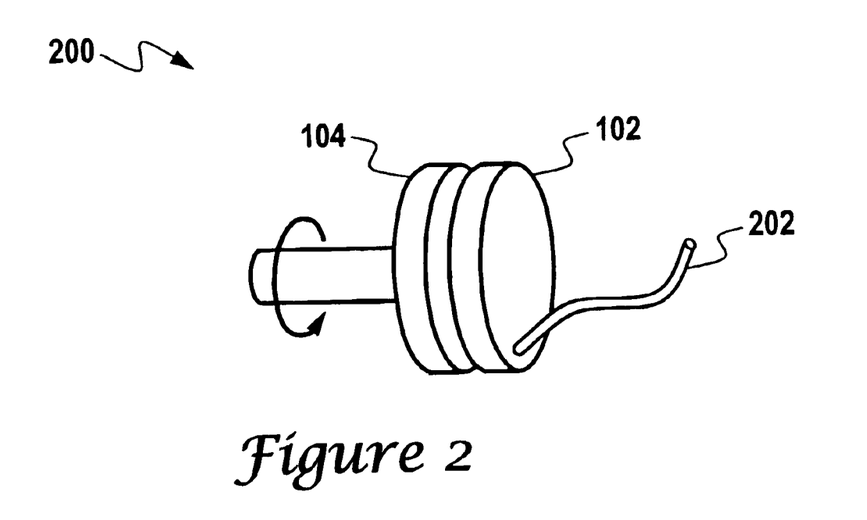
FIG. 2 depicts a diagram illustrative of a gearless rotary sensor and a power cable thereof in accordance with a preferred embodiment of the present invention.

FIG. 2 illustrates a diagram illustrative of a gearless rotary sensor 200 and a power cable 202 thereof in accordance with a preferred embodiment of the present invention. Also, in FIG. 2, rotor 104 and stator 102 are illustrated. Power cable 202 is generally associated with and/or connected to stator 102.

Figure 3:
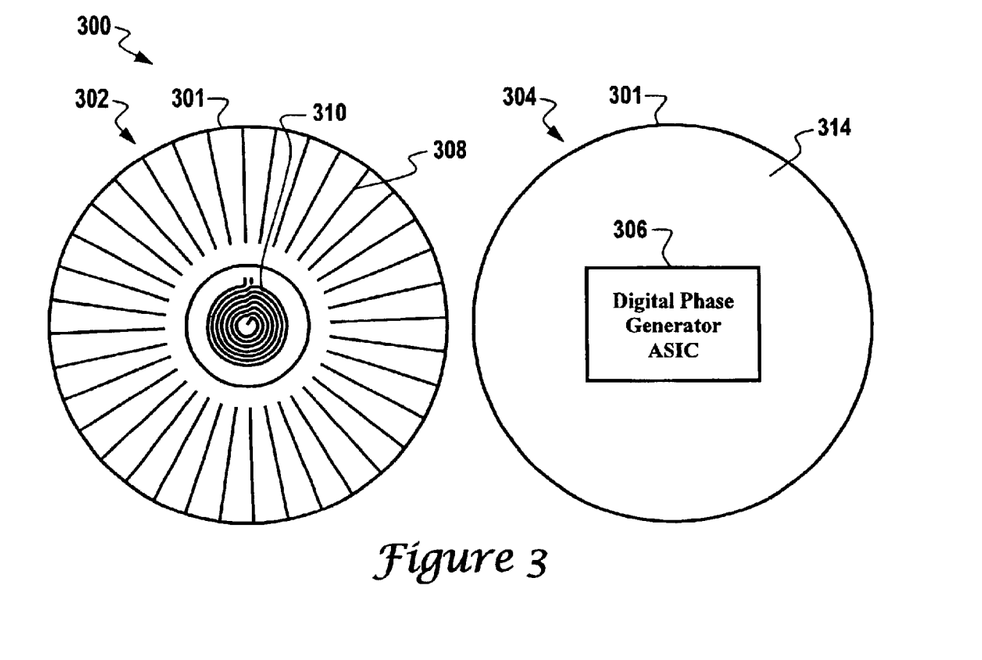
FIG. 3 depicts a schematic diagram of a stator in accordance with a preferred embodiment of the present invention.

FIG. 3 depicts a schematic diagram 300 of a stator 301 in accordance with a preferred embodiment of the present invention. Note that stator 301 of FIG. 3 is analogous to stator 102 of FIGS. 1 and 2. A first side 302 (e.g., facing the rotor) and a second side 304 (e.g., backside) of stator 301 are illustrated in FIG. 3. First side 302 can face a rotor, such as, for example, a rotor 402 illustrated in FIG. 4. Stator 301 includes a digital phase generator ASIC 306, which can be connected to and/or integrated with stator 301 at a central location of stator 301. A ground plane 314 is also illustrated in FIG. 3.

Stator 301 can be configured to include a transmitter with radial spokes 308. Radial spokes 308 can be referred to also as "transmitting spokes". A receiving coil 310 is generally located at the center of stator 301. In the illustrative example depicted in FIG. 3, thirty-six spokes (i.e., radial spokes 308) are indicated. As shown, a spoke is located every ten degrees. Each spoke can transmit a different digital code so that the position of the rotor (e.g., rotor 402 of FIG. 4) is known at any time while being generally independent of speed.

A reference square wave (or other reference) signal can be transmitted on the spoke at zero degrees. This same waveform can be delayed ten electronic waveform degrees and transmitted on the spoke at ten mechanical degrees, and so on, across the circle which comprises stator 301. In other words, the phase delay on each spoke corresponds to the physical position of that spoke on the wheel.

Figure 4:
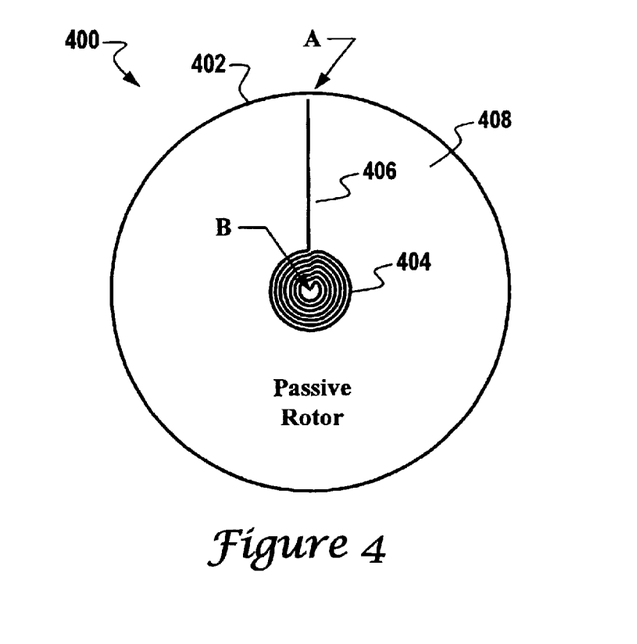
FIG. 4 depicts a schematic diagram of a passive rotor in accordance with a preferred embodiment of the present invention.

FIG. 4 illustrates a schematic diagram 400 of a passive rotor 402 in accordance with a preferred embodiment of the present invention. Rotor 402 includes a transmitting coil 404 that can be connected to a single receiving spoke 406, which is located above a ground plane 408. Transmitting coil 404 is located at the center of rotor 402, thus comprising a center coil. The single receiving spoke 406 is connected to the center coil (i.e., transmitting coil 404).

The receiving spoke 406 is generally connected to the ground plane 408 at point A, while the center coil (i.e., transmitting coil 404) is connected to the ground plane 408 at point B. Points A and B thus comprise contacts to ground plane 408. The transmitting spoke of the stator (i.e., stator 301) is transformer-coupled to the receiving spoke 406 of the passive rotor 402. The receiving spoke 406 effectively can comprise a shorted transformer secondary winding operating in a current mode. Rotor 402 thus can be configured as a two-sided PC board that is completely passive.

Figure 5:
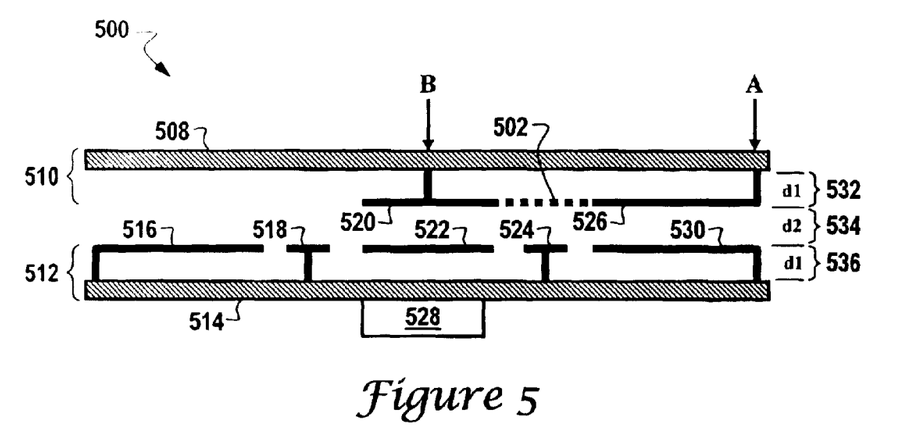
FIG. 5 depicts a schematic diagram illustrating a cross section of a stator and rotor in accordance with a preferred embodiment of the present invention.

FIG. 5 depicts a schematic diagram 500 illustrating a cross-sectional view of a rotor 510 and a stator 512, in accordance with a preferred embodiment of the present invention. Note that rotor 510 is analogous to rotor 402 of FIG. 4, while stator 512 is analogous to stator 301 depicted in FIG. 3. Rotor 510 includes a ground plane 508, and stator 512 includes a ground plane 514. Ground plane 508 of FIG. 5 is analogous to ground plane 408 of FIG. 4. Similarly, ground plane 514 is analogous to ground plane 314, which is depicted in FIG. 4. Note that points A and B illustrated in FIG. 5 are generally analogous to points A and B depicted in FIG. 4.

A plurality of transmitting spokes 516 and 530 are associated with stator 512. For example, thirty-six spokes can be connected to and integrated with stator 512, depending upon a desired implementation. Ground contacts 518 and 524 generally form part of a ground ring that shield signals for transmitting spokes 516 and 530 from directly coupling in the receiving coil 522. An ASIC 528 is also generally connected to and/or integrated with stator 512. ASIC 528 of FIG. 5 is analogous to ASIC 306 of FIG. 4. ASIC 528 can be located on the backside of ground plane 514 to reduce direct coupling from transmitting spokes 516 and 530. A single receiving spoke 526 is associated with rotor 510. A transmitting coil 520 is additionally associated with rotor 510. Transmitting coil 520 is analogous to transmitting coil 404 of FIG. 4. Receiving spoke 526 is analogous to receiving spoke 406 of FIG. 4.

Rotor 510 and stator 512 each possess ground planes 508 and 514, respectively, to reduce noise and EMI. Such ground planes can provide transmission line quality digital pulses.

Note that the distance 532 between receiving spoke 526 to ground plane 508 of rotor 510 is represented by the variable d1. Additionally, the distance 536 between transmitting spoke 530 to ground plane 514 of stator 512 is represented by the variable d1. The distance 534 between receiving spoke 526 and transmitting spoke 530 is represented by variable d2. Distances 532 and 536 can be shortened, while the source impedance can be matched to the characteristic impedance of the spokes.

Transmitting spokes 516 and 530 (e.g., a total of 36 spokes) can be shielded from direct coupling to receiving coil 522 or 310 by a ground ring 518 and 524. Note 518 and 524 represent the same ground ring. Transmitting spokes 516 and 530 represent a plurality of transmitting spokes that are associated and/or integrated with stator 512. The magnetic fields around the spokes are generally configured at 90 degrees to the center coil (i.e., receiving coil 522) to minimize direct coupling. Also, the distance between transmitting spokes 516, 530 and receiving coil 522 is preferably greater than two times the distance between rotor 510 and stator 512 to reduce direct coupling. The ASIC 528 can be placed on the backside of ground plane 514 to reduce direct coupling.

The single receiving spoke 526 and ground plane 508 of rotor 510 generally serve as a single loop to capture magnetic flux lines from nearby transmitting spokes. Such changing flux lines produce current in the transmitting coil 520, which can then be transformer-coupled to receiving coil 522 located at the center of stator 512. Also, an electrical connection is formed between the transmitting coil 520 and the receiving spoke 526 as shown in FIG. 5. In general, fast edge rates produced by ASIC 528 are desirable for quality coupling between rotor 510 and stator 512.

Figure 6:
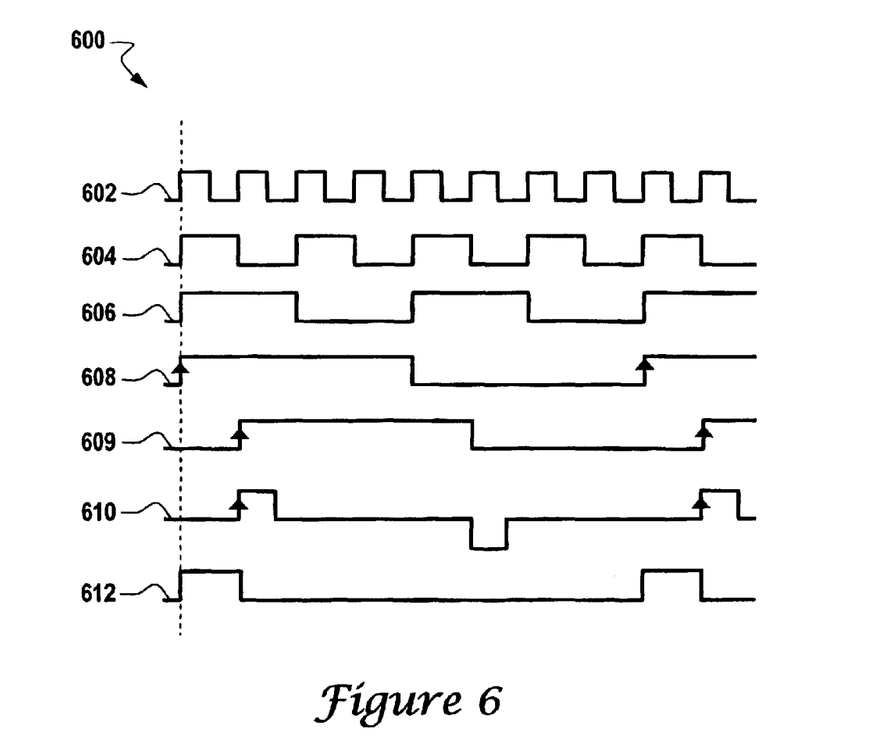
FIG. 6 depicts a timing diagram in accordance with a preferred embodiment of the present invention.

FIG. 6 illustrates a timing diagram 600 in accordance with a preferred embodiment of the present invention. Timing diagram 600 illustrates clock pulses 602, 604, and 606. A stator reference signal 608 is also indicated, along with a stator transmitter signal 609, which indicates a stator transmitter signal at N degrees. A rotor/stator-receiving signal 610 is also illustrated in addition to the final output signal 612. The clock frequency 602 is generally generated at N times the fundamental stator frequency, where N represents the number of spokes. The clock frequency 602 is divided down 604, 606, 608, etc. to provide the precise reference signal 608 and phase delayed signals, such as signal 609. Note that signal 609 represents one of N phase delayed signals. The fundamental stator frequency is phase delayed N times for each spoke by $(360/N) \times (0, 1, 2, 3, (N-1))$ degrees. For example, 36 spokes would provide electrical phase delays of 0, 10, 20, 30, 40, etc. and 360 degrees.

The rotor single spoke located nearest a transmitting spoke N receives an inductively coupled signal, which in turn couples the leading edge via the center coil to the stator. The leading edge of the stator reference signal 608 can be utilized to set a flip-flop, for example, while the leading edge of a stator-receiving signal (i.e., see rotor/stator receiving signal 610) can be utilized to clear the flip-flop. The output of the flip-flop is signal 612. The signal 612 is pulse-width modulated from 0% to a 100% duty cycle corresponding to 0 to 360 degrees of rotation. This signal 612 can then be filtered to provide a linear voltage value proportional to degrees of rotation.

It can be appreciated based on the foregoing description that the present invention can be modified to interpolate degrees of rotation between those defined by the N transmitting spokes. Because the magnetic field from a currentcarrying conduction element can fall off as 1/r, the present invention can be made linear between transmitting spokes. The sum of signals from adjacent transmitting spokes generally results in a threshold crossing that is proportional to the rotor position. This can be achieved by controlling the rise times of the transmitted signal. The rise times should be approximately on the order of one phase delay between spokes.

Figure 7:
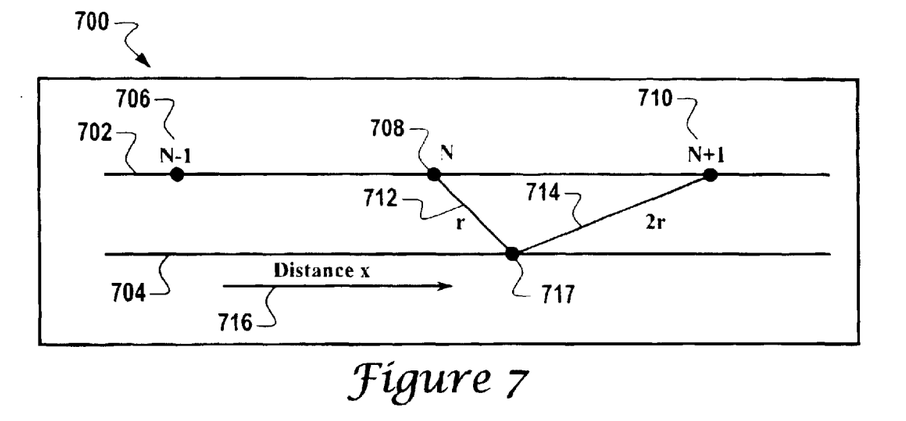
FIG. 7 depicts a spatial diagram illustrating cross-sectional view of transmitting and receiving spokes versus space in accordance with a preferred embodiment of the present invention.
Figure 8:
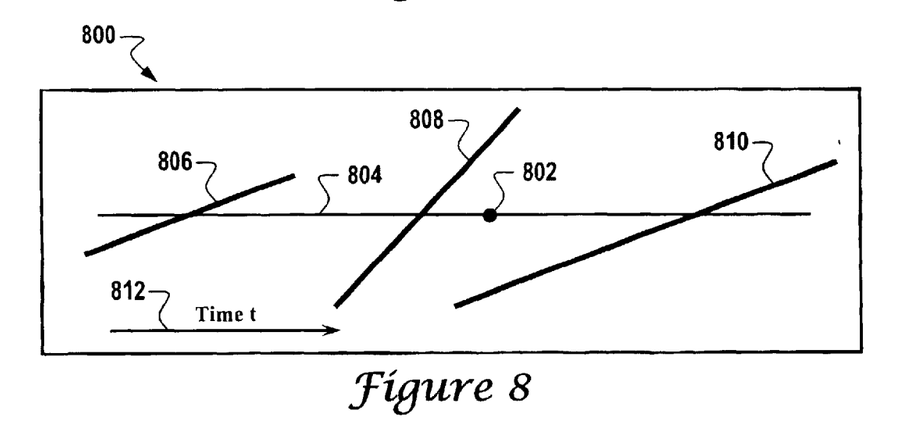
FIG. 8 depicts a spatial diagram illustrating output as indicated by receiving spoke versus time in accordance with a preferred embodiment of the present invention.

FIG. 7 depicts a spatial diagram 700 illustrating cross-sectional view of transmitting and receiving spokes versus space, in accordance with a preferred embodiment of the present invention. FIG. 7 generally illustrates the spatial relationship associated with the present invention. FIG. 8 on the other hand, illustrates a time diagram 800 illustrating output as indicated by receiving spoke versus tine as indicated by arrow 812, in accordance with a preferred embodiment of the present invention. FIG. 8 illustrates the time relationship associated with the present invention. For the rotary position sensor of the present invention, it is important to distinguish between space and time variables as well as mechanical and electrical degrees.

As indicated in FIG. 7, a rotor 704 is generally indicated between spokes N and N+1 as respectively indicated at points 708 and 710. Note that rotor 704 is analogous to rotor 402 of FIG. 4. Similarly, stator 702 is analogous to stator 301 of FIG. 3. Rotor 704 is generally located closer to N than N+1, as indicated by the depiction of point 717 closer to point 708 than to point 710. The rise time and gain of the transmitted signal from the viewpoint of rotor 704 is generally proportional to 1/r. In FIG. 7, distance 716 is generally represented as a variable x (i.e., see "distance x"). Distance 712 from point 717 to point 708 is generally represented by the variable r, while the distance 714 between point 717 and point 710 is indicated by the variable 2r.

In the examples illustrated in FIGS. 7 and 8, the slope of the signal received from spoke N is twice the slope from the spoke N+1. A single rotor spoke receives the sum of the spokes from N transmitted spokes. The transmitting spoke located nearest the receiving spoke dominates the time response. Note that if rotor 704 is directly in line with spoke N (i.e., point 708), the signal from spokes N−1, which is indicated as point 706, and N+1, which is indicated at point 710, are generally equivalent to one another and cancel one another, resulting in the signal from spoke N crossing the threshold 804 of FIG. 8 at the correct time. The slope associated with N−1 is illustrated in FIG. 8 as slope 806. The slope associated with N is depicted in FIG. 8 as slope 808. The slope associated with N+1 is indicated in FIG. 8 as slope 810. The threshold crossing for the sum of the slopes is indicated at point 802. The linearity of the system can be verified by summing the signals from N transmitted spokes for all rotor positions. Modulating the transmitting signals amplitudes and phase delays and averaging the receiving signals can improve the linearity of the system further.

Figure 9:
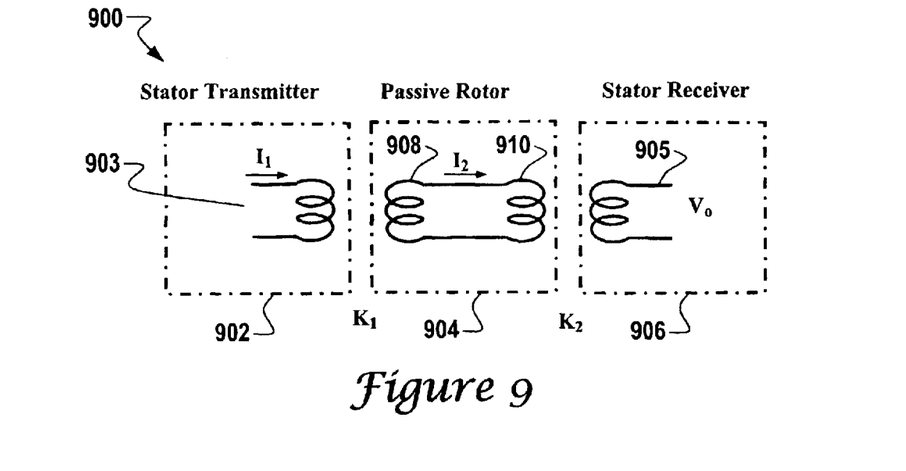
FIG. 9 depicts a transformer model in accordance with a preferred embodiment of the present invention.

FIG. 9 depicts a transformer model 900 in accordance with a preferred embodiment of the present invention. A transformer model, such as transformer model 900, can be utilized to represent the magnetic coupling between the stator and rotor described herein. A stator transmitter 902 is generally formed from a winding 903 representing one of the transmitting spokes. A passive rotor 904 is generally formed from windings 908 (i.e., receiving spoke) and 910 (i.e., transmitting coil), while a stator receiver 906 is formed from a secondary winding 905. Windings 903 and 908 generally form a transformer 1, while windings 910 and 905 generally form a transformer 2. A current $I_1$ travels through winding 903, while a current $I_2$ travels through windings 908 and 910. Currents $I_1$ and $I_2$ are in phase because the transformer 1 is operating in the current mode with the secondary winding of transformer 1 effectively shorted by winding 910.

Each transformer includes a secondary and primary coil. A secondary coil of transformer 1 can comprise a single rotor spoke, which is shorted by a primary coil of transformer 2. Therefore, transformer 1 operates in a current mode. A secondary coil (i.e., coil 905) of transformer 2 provides an open circuit voltage $V_o$. A coupling coefficient $K_2$ is much greater than coupling coefficient $K_1$ because of the multi-turn coils located near the rotary axis. Note that coils 908 and 910 can be opened to permit a continuous shaft to pass through the center of the sensor if desired.

An illustrative example of one embodiment of the present invention is described generally as follows. Two copper discs (10 cm DIA) can be utilized to configure a stator and rotor, in accordance with the present invention. Such a stator may possess a 20-mm transmitting spoke and a 7.5 turn receiving coil, while the rotor may possess a 20-mm receiving spoke and a 7.5 turn transmitting coil. A 10 V pulse with 50-ohm source impedance can be utilized to drive the transmitter. A resulting current pulse of 200-ma can thus be achieved with a rise time of 20-ns. Transmitting and receiving spokes can be placed 5-mm from an associated ground plane (i.e., distance d1). The receiving coil can be terminated with a 50-ohm load. The received signal can be, for example, 50-mV with a spacing of 2-mm between the rotor and stator (i.e., distance d2). With a stator and rotor spacing of 5-mm, the signal that can be achieved is approximately 15 mV. The signal levels can be increased with faster rise times and the power consumption reduced by utilizing narrow pulses.

The present invention thus provides a number of advantages because only two discs are required, unlike other systems, which utilize three or more discs. In accordance with the present invention, one disc remains stationary while the other disc is free to rotate with no sliding contacts. The present invention does not require ideal sine wave generators and can utilize digital logic. The system can be easily implemented in a digital ASIC at low cost and with an anticipated accuracy better than 0.5 degrees. The accuracy increases with the number of transmitting spokes. The stator transmits phase-delayed signals by means of radial spokes. The phase delay in electrical degrees corresponds to the physical degrees of the transmitting spoke on the stator.

Figure 10:
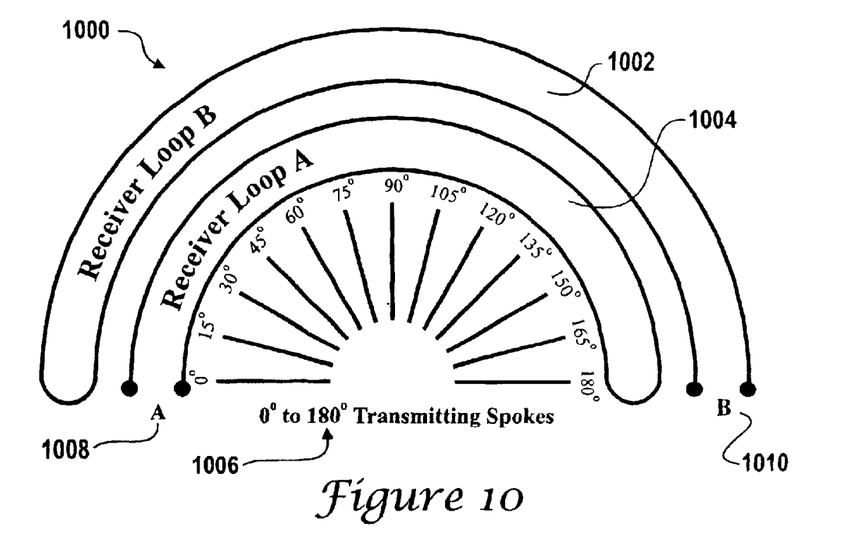
FIG. 10 depicts a diagram illustrating an alternative stator approach in accordance with an alternative embodiment of the present invention.
Figure 11:
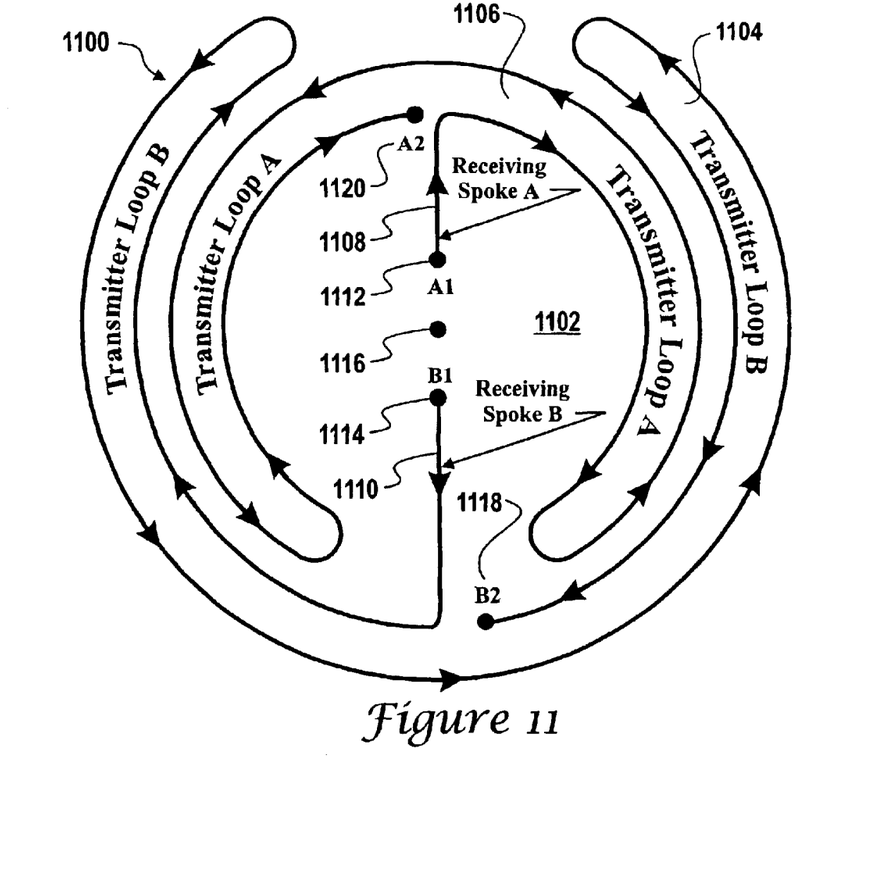
FIG. 11 depicts a diagram illustrating an alternative rotor approach in accordance with an alternative embodiment of the present invention.

FIG. 10 illustrates a diagram illustrating an alternative stator approach in accordance with an alternative embodiment of the present invention. FIG. 11 depicts a diagram illustrating an alternative rotor approach in accordance with an alternative embodiment of the present invention. FIG. 10 depicts a stator 1000, which is composed of a receiver loop 1002 and a receiver loop 1004. Receiver loop 1002 is labeled receiver loop B as indicated at point 1010, and receiver loop 1004 is labeled receiver loop A as indicated at point 1008. FIG. 11 illustrates a rotor 1100. Rotor 1100 generally includes a transmitting loop 1104 and a transmitting loop 1106. Transmitting loop 1104 is labeled transmitting loop B and transmitting loop 1106 is labeled transmitting loop A. Rotor 1100 comprises a passive rotor.

FIGS. 10 and 11 should be interpreted together to appreciate the functioning of this alternate embodiment. Thus, FIGS. 10 and 11 together illustrate an alternative stator 1000 and rotor 1100 approach in accordance with the present invention. In some applications, the end or face of the rotating shaft or member is not easily accessible. The configuration depicted in FIGS. 10 and 11 can be implemented in the context of presently utilized gear tooth and magnetic sensor applications. In the configuration illustrated in FIGS. 10 and 11, the magnetic sensor can be generally located on one side of a gear tooth disc.

In FIG. 11, rotor 1100 (i.e., a passive rotor) comprises a 360-degree disc while in FIG. 10, stator 1000 comprises a 180-degree semicircle. Stator 1000 comprises an active stator that can be easily removed and replaced within the associated system. As indicated in FIG. 11, the rotor 1100 can include two receiving spokes 1108 and 1110 located 180 degrees apart. Receiving spoke 1108 is labeled receiving spoke A, while receiving spoke 1110 is labeled receiving spoke B. These spokes are located above a ground plane disc (i.e., ground plane 1102) at a distance comparable to the distance between stator 1000 and rotor 1100. Transmitting loops 1106 and 1104 are associated with receiving spokes 1108 and 1110, respectively. Such transmitting loops are located near the outer circumference of the rotor ground plane 1102. Receiving spoke 1108 includes a node 1112 (i.e., A1), while receiving spoke 1110 includes a node 1114 (i.e., B1). A center point 1116 of rotor 1100 is located between nodes 1112 and 1114. Additionally, transmitting loop 1106 includes a node 1120 (i.e., A2), while transmitting loop 1104 includes a node 1118 (i.e., B2). Nodes A1, A2, B1, and B2 are connected to the ground plane 1102. Nodes A1 and A2 close the current path for transmitter loop A while nodes B1 and B2 close the current path for transmitter loop B.

As illustrated in FIG. 10, stator 1000 is composed of a one-half disc with radial transmitting spokes 1006 with phase delayed signals ranging from 0 to 180 degrees. The two receiving loops 1002 and 1004 are aligned with the corresponding transmitting loops 1104 and 1106 of rotor 1100 and are located near the perimeter of transmitting spokes 1106. During the first 180 degrees, phase delayed transmitted signals are received by receiving spoke A (i.e., receiving spoke 1108) and retransmitted back to stator 1000 by transmitting loop A (i.e., transmitting loop 1106). During the second 180 degrees, the phase delayed transmitted signals are received by receiving spoke B (i.e., receiving spoke 1110) and retransmitted back to stator 1000 by transmitting loop B (i.e., transmitting loop 1104). At exactly 0 and 180 degrees, both receiving loops A and B (i.e., receiver loops 1004 and 1002) receive signals so that at no time is information lost.

Another variation that may be implemented in the context of an alternative embodiment of the present invention is for the rotor and stator to comprise concentric cylinders or drums. In such a scenario, the transmitting and receiving radial spokes can be replaced with transmitting and receiving lines running parallel to the rotating axis. The transmitting and receiving lines can be located on the circumference of the cylinders. This approach requires more area but allows for greater coupling and, therefore, larger signals between rotor and stator, depending on the length of the lines and cylinder. The transmitting and receiving coils can be located at the ends of the cylinders.

Still, further variations can be implemented in accordance with alternative embodiments of the present invention as will become apparent to those skilled in the art. For example, two of the magnetic sensors described herein (i.e., a 360 Degree Absolute Non-Contact Rotary Position Sensor) can be used to construct a torque sensor. A rotary sensor can be placed at each end of a semi-rigid rotating member, wherein the following variables hold true:

$$T = K(\theta_2 - \theta_1)$$

where:

T, is the Torque

K, proportionality Constant $\theta_1$, rotational angle of first sensor $\theta_2$, rotational angle of second sensor As indicated above, the torque T is proportional to the difference in the input and output rotary sensor angles. The torque can be measured for zero to maximum speed because of the no-contact feature of the present invention. Alternatively, rotary sensors can be placed at the input and output of transmissions to monitor efficiency and slippage.

The embodiments and examples set forth herein are presented to explain the present invention and its practical application and to thereby enable those skilled in the art to make and utilize the invention. Those skilled in the art, however, will recognize that the foregoing description and examples have been presented for the purpose of illustration only. Other variations and modifications of the present invention will be apparent to those of skill in the art, and it is the intent of the appended claims that such variations and modifications be covered. For example, those skilled in the art can appreciate that the present invention can be applied to cam and crank applications (e.g., camshaft or crankshaft devices) utilized in automobiles and any type of rotary actuator system of less than 360 degrees. The present invention may be also applied to a variety of other applications, where it may be necessary to sense rotary positions, including aerospace, trucking, heavy equipment, and other applications.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. An apparatus for sensing rotary position, said apparatus comprising:

a stator and at least one transmitting spoke associated with said stator, wherein said at least one transmitting spoke transmits a delayed signal in electrical degrees comprising data indicative of a physical location of said at least one transmitting spoke on said stator;

a rotor comprising at least one radial spoke for receiving angular information from said stator, wherein said rotor is located in a non-contact position proximate to said stator such that said at least one radial spoke comprises a receiving spoke associated with said rotor; and at least one coil located centrally between said stator and said rotor, wherein said angular information is broadcast to said stator from said rotor through said at least one coil to resolve angles between spoke positions thereof and thereby sense rotary positions.

2. The apparatus of claim 1 wherein said rotor comprises a passive rotor.

3. The apparatus of claim 1 wherein said at least one coil comprises a receiving coil associated with said stator.

4. The apparatus of claim 1 wherein said at least one transmitting spoke comprises a plurality of transmitting spokes.

5. An apparatus for sensing rotary position, said apparatus comprising:

a stator:

a rotor comprising at least one radial spoke for receiving angular information from said stator, wherein said rotor is located in a non-contact position proximate to said stator; and at least one coil located between said stator and said rotor, wherein said angular information is broadcast to said stator from said rotor through said at least one coil a resolve angles between spoke positions thereof and thereby sense rotary positions and wherein said at least one coil is located at a circumference between said stator and said rotor.

6. The apparatus of claim 5 wherein said rotor comprises a passive rotor.

7. The apparatus of claim 5 wherein said at least one coil comprises a transmitting coil associated with said rotor.

8. The apparatus of claim 5 wherein said at least one radial spoke comprises a single receiving spoke associated with said rotor.

9. The apparatus of claim 5 wherein said at least one transmitting spoke is associated with said stator.

10. The apparatus of claim 9 wherein said at least one transmitting spoke transmits a delayed signal in electrical degrees comprising data indicative of a physical location of said at least one transmitting spoke on said stator.

11. A method for sensing rotary position, said method comprising the steps of:

locating a stator in a non-contact position proximate to a rotor, wherein said rotor comprises at least one radial spoke for receiving angular information from said stator, wherein said at least one radial spoke comprises a receiving spoke associated with said rotor;

locating at least one coil between said stator and said rotor; configuring said at least one coil to comprise a transmitting coil associated with said rotor;

associating at least one transmitting spoke with said stator; and broadcasting angular information of said stator from said rotor through said at least one coil to resolve angles between spoke positions thereof and thereby sense rotary positions by transmitting from said at least one transmitting spoke, a delayed signal in electrical degrees comprising data indicative of a physical location of said at least one transmitting spoke on said stator.

12. The method of claim 11 wherein said at least one coil is located centrally between said stator and said rotor.

13. The method of claim 11 wherein said at least one coil is located at a circumference between said stator and said rotor.

14. The method of claim 11 further comprising the step of configuring said rotor to comprise a passive rotor.

15. The method of claim 11 further comprising the step of configuring said at least one coil to comprise a receiving coil associated with said stator.

16. The method of claim 11 wherein said at least one transmitting spoke comprises a plurality of transmitting spokes.

17. A method for sensing rotary position, said method comprising the steps of:

locating a stator in a non-contact position proximate to a passive rotor, wherein said stator is associated with a receiving coil;

associating said stator with at least one transmitting spoke for transmitting angular information in the form of a delayed signal in electrical degrees comprising data indicative of a physical location of said at least one transmitting spoke on said stator;

associating a passive rotor with a transmitting coil, wherein said passive rotor is located in a non-contact position proximate to said stator;

receiving said angular information from said stator through at least one radial spoke associated with sad passive rotor, wherein said angular information originates from said at least one transmitting spoke; and broadcasting said angular information to said receiving coil associated with said stator from said transmitting coil associated with said passive rotor to resolve angles between spoke positions thereof and thereby sense rotary positions.

* * * * *